United States Patent [19]

Beilock et al.

[11] 4,403,838

[45] Sep. 13, 1983

[54] PRECISION POINTING AND STABILIZATION SYSTEM

[75] Inventors: Milton M. Beilock, Orange; John M. Wuerth, Fullerton, both of Calif.

[73] Assignee: Rockwell International Corporation, El Segundo, Calif.

[21] Appl. No.: 202,209

[22] Filed: Oct. 30, 1980

[51] Int. Cl.³ .............................................. G02B 23/16
[52] U.S. Cl. .................................................... 350/500
[58] Field of Search ............... 350/16, 85, 82; 308/10; 73/178 R; 244/3.16; 250/203 R

[56] References Cited

U.S. PATENT DOCUMENTS

| | | | |
|---|---|---|---|
| 3,742,770 | 7/1973 | Flannelly | 350/16 |
| 4,085,910 | 4/1978 | Baker et al. | 350/16 |
| 4,088,018 | 5/1978 | Anderson et al. | 308/10 |

Primary Examiner—Jon W. Henry
Attorney, Agent, or Firm—H. Fredrick Hamann; S. Alfred Uchizono

[57] ABSTRACT

Apparatus for controlling the spatial orientation of an angularly displacable working head supported by a base and relative to a given frame of reference. The apparatus comprises a linkage having terminal first and second articulate couplers coupling the working head to the base across the longitudinal axis of the linkage, wherein the first and second articulate couplers are located relative to each other to effectively isolate the working head freely of components of acceleration of the base perpendicular to the linkage longitudinal axis, means for sensing the providing control signals derived from said sensing, the relative angular positions and relative angular velocities between the working head and the linkage, and the existing spatial orientation of the working head relative to the given frame of reference, means for applying torque between the working head and the linkage and between the linkage and the base responsive to the derived control signals to control the spatial orientation of the working head relative to the given frame of reference.

18 Claims, 2 Drawing Figures

PRECISION POINTING AND STABILIZATION SYSTEM

BACKGROUND OF THE INVENTION

1. Field of the Invention

This invention has to do with pointing and stabilization of telescopes, for example, in surface, airborne, and orbiting applications. More specifically, the invention relates to apparatus and systems for providing precise and stable orientation of a telescope, gun sight, navigational device, or other working head, in environments where undesirable, orientation-altering disturbances, as well as desirable orientation-altering impulses are transmitted to the working head through its base platform or support structure.

In a typical application requiring the present system, a large earth orbiting optical telescope is the stabilized element. Depending on the size of such a stabilized payload instrument, its articulation and stabilization demands may be beyond the scope of conventional approaches used for minimizing orientation-altering disturbances, such as concentric, servo-driven gimbals, and particularly so, when size or other design constraints make it difficult to locate the axes of rotation of the working head near its center of gravity. Without such colocation, acceleration of the support structure may result in orientation-altering disturbances in conventional systems of pointing and stabilization. While, theoretically, such problems can be ameliorated by scaling conventional approaches upward, where extremely accurate pointing and stabilization are required, undesirable levels of design complexity arise, with their attendant problems of component reliability and increased power consumption. These considerations militate against upward scaling of conventional gimbal systems. In addition, increases in hardware design complexity commonly necessitate like increases in complexity of the software to support the hardware.

It is accordingly, a major objective of the present invention to provide an apparatus and system for the improved pointing and stabilization of a working head, such as an orbiting telescope, typically in an earth orbiting spacecraft application. A further objective is to provide an improved pointing and stabilization apparatus embodying a design less complex than scaled conventional systems and which requires only more easily realized standards of component performance, and thereby, affords increased system reliability and reduced power consumption.

It is a specific objective of this invention to provide an apparatus for controlling the spatial orientation of an angularly displaceable working head supported by a base and relative to a given frame of reference, and particularly by application of torque between the head, or base, and a connecting linkage therebetween, in stabilization relation against unwanted response to orientation-altering disturbances, and in directional relation to reorient the working head to a precise prescribed position relative to the frame of reference.

SUMMARY OF THE INVENTION

These and other objectives of the invention to become apparent hereinafter are realized in accordance with the invention in apparatus for controlling the spatial orientation of an angularly displaceable working head supported by a base and relative to a given frame of reference, the apparatus comprising a linkage having terminal first and second articulate couplers coupling the working head to the base across the longitudinal axis of the linkage, wherein the first and second articulate couplers are located relative to each other to effectively isolate the working head freely of components of acceleration of the base perpendicular to the linkage longitudinal axis, means for sensing and providing control signals derived from the sensing, the relative angular positions and relative angular velocities between the working head and the linkage and between the linkage and the base, and the existing spatial orientation of the working head relative to the given frame of reference, and means for applying torque between the working head and the linkage and between the linkage and the base responsive to the derived control signals to control the spatial orientation of said working head relative to the given frame of reference. The articulate couplers typically define pivot means. The working head typically comprises a telescope, and the base an earth orbiting platform.

In preferred embodiments, the apparatus includes also means providing a desired working head spatial orientation signal, and means comparing the control signal derived from sensing the existing spatial orientation of the working head and the desired spatial orientation signal and generating an error signal therefrom, the operating structure means for applying torque being responsive to the error signal generation to correspondingly adjust the spatial orientation of the working head to a desired condition relative to the frame of reference, as well as transducer means generating further signals responsive to relative adjustment in angular position and angular velocity between the working head and the linkage, and means responsive to the further signals to adjust the relative position of the linkage and the working head. There is further provided means combining the further signals with the error signal, whereby a combined signal is generated responsive to adjustments to the relative positioning of the linkage and the working head.

In highly specific embodiments, there is provied apparatus in which the operating structure comprises a nominally linear electromechanical DC torquer having a motor winding and permanent magnet cooperatively arranged to provide torque at the articulate couplers and between the linkage and the head or base. In such embodiments, as in previously mentioned embodiments articulate couplers define pivot means, where preferably, the locations of the pivot means relative to each other are arranged to effectively isolate the working head freely of components of acceleration of the base perpendicular to the linkage longitudinal axis. Again, preferably, the working head comprises a telescope and the base an earth orbiting platform.

The invention further contemplates provision of means sensing the existing spatial orientation of the working head relative to the frame of reference in signal generating relation, means providing a desired working head spatial orientation signal, and means comparing the existing and the desired spatial orientation signals and generating an error signal, the operating structure being responsive to the error signal generation to correspondingly adjust the spatial orientation of the working head to a desired condition relative to the frame of reference. There is also provided, transducer means generating further signals responsive to relative adjustment in angular position and angular velocity between the working head and the linkage, and means responsive to the further signals to adjust the relative position of the linkage and the working head, as well as means combining the further signals with the error signal, whereby a combined signal is generated responsive to adjustments to the relative positioning of the linkage and the working head.

In a particularly preferred embodiment, there is provided a pointing and stabilization system adapted to point and hold a working head in precise and predetermined orientation relative to a frame of reference, including a rigid linkage comprising gimbal means coupling the working head and the base in axially opposed relation, the gimbal means defining first and second rotation enabling pivots, whereby the linkage is rotatably attached to the base at the first pivot, and the linkage is further rotatably attached to the working head at the second pivot, the first and second pivots being relatively spaced to so locate the linkage ideal center of percussion as to minimize disturbance torque effects;

means determining simultaneously the angular position and the angular velocity of the working head relative to the frame of reference and the relative angular position and velocity between the working head and the linkage in signal generating relation;

means applying torque between the linkage and the base at the first pivot selectively in generated signal responsive relation; and means applying torque between the linkage and the working head at the second pivot selectively in generated signal responsive relation;

whereby the working head is pointed or stabilized in desired spatial orientation relative to the frame of reference and freely of disturbance effects.

In this last mentioned embodiment, preferably the location of each of the pivots coincides with the center of percussion for the opposite linkage pivot, and an axial line passing through both of the pivots lies within an axial locus including the working head center of gravity. Also preferably, an axial line passing through both pivots is controlled to lie within a determinable distance from the working head center of gravity.

BRIEF DESCRIPTION OF THE DRAWINGS

The invention will be further described as to an illustrative embodiment thereof in conjunction with the attached drawings in which.

DESCRIPTION OF THE PREFERRED EMBODIMENT

Figure 1:
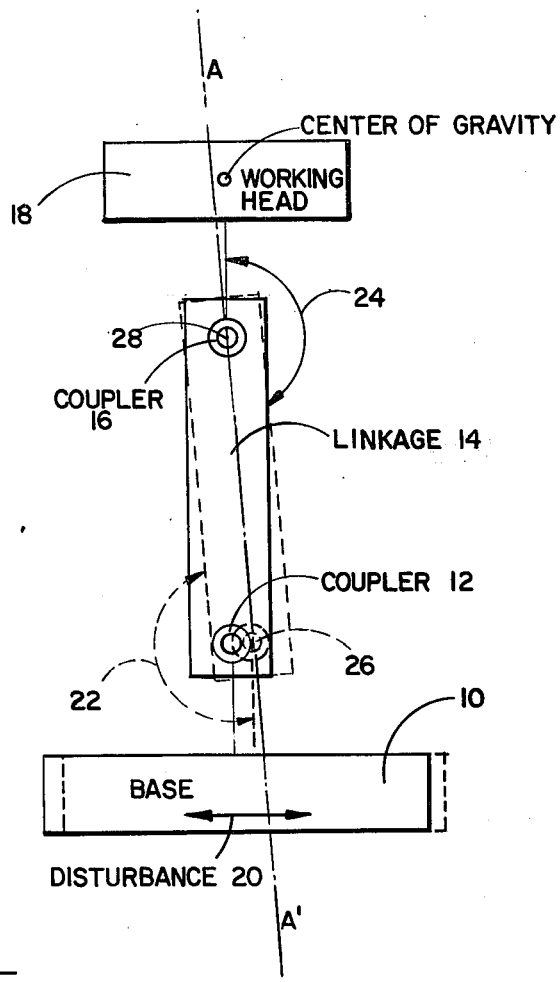
FIG. 1 is a view of a schematic representation of a single axis stabilization apparatus along the axis of rotation.

In the present invention, a desirably stable element, such as a telescope is mounted and controlled so as to minimize angular motions of the stable element resultant from linear or angular motions of the support base. The invention makes use of the dynamic principle that a mass will remain stable, or remain rotating at constant angular velocity, in inertial space in the absence of disturbing forces or torques.

Turning now to the drawings in detail, the base or platform bears the legend Base and is indicated at 10, the element to be stabilized bears the legend Working Head and is designated 18. The base 10 and working head 18 are interconnected by a rigid, axially elongated linkage 14. The working head 18 is rotatably connected to the linkage 14 through its terminus at one end defined by the coupler 16. For optimum performance the coupler 16 comprises typically a low friction pivot connection between the rotating motion of the linkage 14 relative to the working head 18. The base 10 is similarly connected to the linkage 14 through a second linkage terminus defined by coupler 12 at the opposite end of the linkage from coupler 16. The coupler 12 is also typically comprised of a low friction pivot connection between the linkage 14 and the base 10.

In a typical operating environment, forces or torques are incident on the base 10. For example, where the base 10 is a spacecraft or platform, these forces and torques may derive from control impulses applied by thrusters to the spacecraft. Additionally, space debris may impact the base 10. Thus, the base 10 is the primary recipient of orientation-altering disturbances which may adversely affect the orientation of the working head, e.g., a telescope. Where these forces and torques are unknown, and/or random, they are not compensable in advance of their incidence. It is to the management of maleffects of unknown or random torques and forces that the present invention is addressed.

The present invention provides for isolation of the working head 18 from unintentional, random or unknown forces, herein generically termed "disturbances" which are incident on the base 10 or working head 18, by reactive compensation, and as well provides for intentional non-reactive adjustment of the working head position relative to a given frame of reference. The reactive compensation is achieved, in general, by initially allowing the base 10 to move in relative independence from the working head 18, while measuring the relative angular position and relative angular velocity of the linkage with respect to the working head. To the extent that the angular position or velocity of the working head 18 deviates from its desired angular position or velocity, a corrective torque, indicated schematically by arrow 24 in FIG. 1, reestablishes the desired angular position and velocity of the working head with respect to the given frame of reference. Simultaneously, a second torque, indicated in FIG. 1 by arrow 22 is applied between the linkage 14 and the base 10 to restore the relative orientation of the linkage to the working head 18 to within dynamic constraints dictated by the overall apparatus and working head geometric and inertial characteristics.

Under those conditions wherein a new orientation for the working head 18 relative to the given frame of reference is prescribed, different from an existing orientation, a torque is applied between the linkage 14 and the working head 18 to control the working head to the new prescribed position. To maintain the relative orientation of the linkage 14 to the working head 18 within a characteristic dynamic envelope, which requires that the center of gravity of the working head lie within a determinable and limited distance from the axis represented by an extended line A—A' connecting the two pivot points 28 and 26, of the couplers 12 and 16, respectively, the linkage 14 is rotated relative to base 10 about the pivot 26 at coupler 12. To effect this rotation, torque is applied between the linkage 14 and the base 10, at the coupler 12, simultaneously with a torque applied between the linkage and the working head 18, at the coupler 16. The indicated torques 22 and 24 are controlled by a signal generating and response system which form a part of the invention for pointing and stabilizing of working heads such as orbital telescopes.

Figure 2:
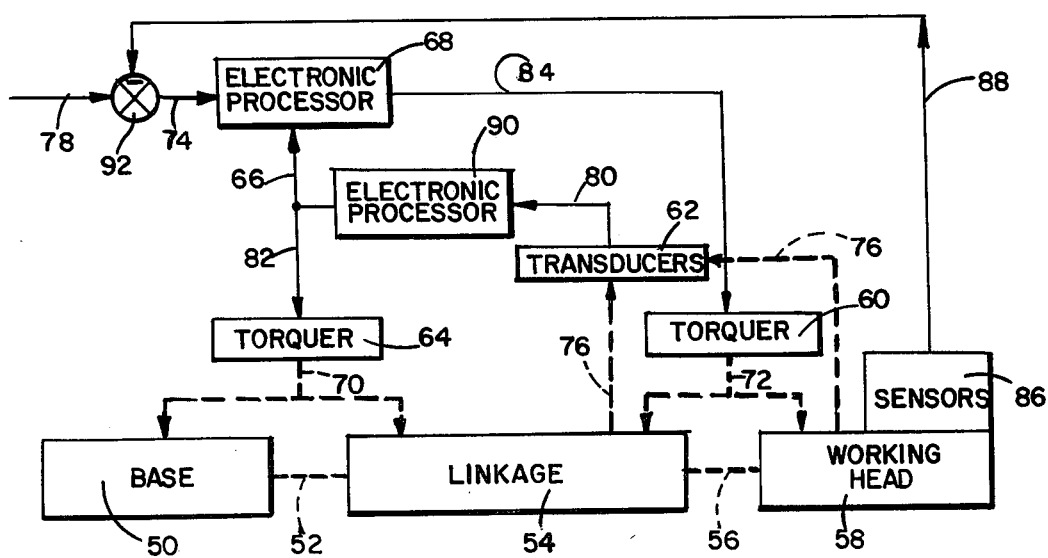
FIG. 2 is a schematic block diagram of the apparatus showing the functional dependence of key elements of the embodiment of the invention upon each other.

In FIG. 2, a block diagram of a pointing and stabilization system according to a presently preferred embodiment of the invention is presented, indicating the overall control loop features. In FIG. 2, the working head 58 and the base 50 are shown linked mechanically by couplings 52 and 56 to the linkage 54 in axially opposed relation. The significance of the geometric relationship illustrated will be clearer after returning briefly to FIG. 1.

In the FIG. 1 embodiment above it is to be noted that disturbances 20 of the base 10 will apply forces to the linkage 14 at the coupler 12. There exists a theoretical point along the linkage 14 where the resulting forces applied to the working head 18 through coupler 16 in a rotation-producing manner can be minimized, assuming the coupler 16 were to be located there. For the idealized, frictionless coupler configuration, this theoretical point is the center of percussion with respect to the location of the coupler 12, or, more generally, that point along the length of the coupler 54 at which the tendency for lateral displacement of coupler 16 responsive to a disturbance is minimal. Although in actual practice, frictionless couplers are not available, it is normally desirable to retain this center of percussion concept as the primary determinant for coupler location.

Referring now to FIG. 2 again, the angular position and angular velocity of the working head 58 relative to a given frame of reference is measured by the sensors 86. The angular position is measured by a sensor, such as a star tracker, or position gyro. The angular velocity of the working head may be measured directly, as by a rate gyro, or may be generated by differentiating the measured angular position signal. The signals corresponding to the angular position and angular velocity are provided at 88 to the comparator 92 where they are compared with the signals provided by input 78 corresponding to the desired angular position and angular velocity. The difference between the two angular position and angular velocity signals at 78 and 88 constitute error signals which are provided at 74 to the electronic processor 68. The processed error signals at 84 are provided to torquer 60 to apply torque at 72 to the working head to null the error signal at 74.

Still referring to FIG. 2, the transducers collectively indicated at 62 determine the relative angular position and relative angular velocity between the working head 58 and the linkage 54 and these data are provided to electronic processor 90 at 80. The relative angular position between the working head 58 and the linkage 54 may be determined, e.g. by a resolver, and the angular velocity either by differentiating the angular position or by direct measurement, e.g. by using a tachometer. To maintain the relative orientation of the linkage 54 to the working head 58 within the aforementioned characteristic dynamic envelope, torque is applied to the linkage 54 by the torquer 64 at 70 in response to the processed transducer generated signals at 82. In correcting the relative orientation between the linkage 54 and working head 58 as described above, undesired torques will typically be applied to the working head as a result of inertial reactions. To compensate for these undesired torques, which are related to torque 70, and thereby minimize disturbing the working head orientation, a compensating torque is applied at 72 to the working head in response to the signal at 66 processed by electronic processor 68.

The preceding description of a preferred embodiment relates to a pointing and stabilization system with one axis of rotation. As will be apparent, the present invention is applicable to pointing and stabilization systems having two or more orthogonal axes of rotation, as well.

We claim:

1. Apparatus for controlling the spatial orientation of an angularly displacable working head supported by a base and relative to a given frame of reference, said apparatus comprising:
    a linkage having terminal first and second articulate couplers coupling said working head to said base across the longitudinal axis of said linkage;
    said first and second articulate couplers located relative to each other to effectively isolate said working head freely of components of acceleration of said base perpendicular to said linkage longitudinal axis;
    means for sensing and providing control signals derived from said sensing, the relative angular positions and relative angular velocities between said working head and said linkage, and the existing spatial orientation of said working head relative to said given frame of reference;
    means for applying torque between said working head and said linkage and between said linkage and said base responsive to said derived control signals to control the spatial orientation of said working head relative to said given frame of reference.

2. The apparatus according to claim 1, in which said articulate couplers define pivot means.

3. The apparatus according to claim 1, in which said working head comprises a telescope.

4. The apparatus according to claim 1, in which said base comprises an earth orbiting platform.

5. The apparatus according to claim 1, including also means providing a desired working head spatial orientation signal, and means comparing said control signal derived from sensing said existing spatial orientation of said working head and said desired spatial orientation signal and generating an error signal therefrom, said means for applying torque being responsive to said error signal generation to correspondingly adjust the spatial orientation of said working head to a desired condition relative to said frame of reference.

6. The apparatus according to claim 5, including also transducer means generating further signals responsive to relative adjustment in angular position and angular velocity between said working head and said linkage, and means responsive to said further signals to adjust the relative position of said linkage and said working head.

7. The apparatus according to claim 6, including also means combining said further signals with said error signal, whereby a combined signal is generated responsive to adjustments to the relative positioning of said linkage and said working head.

8. The apparatus according to claim 1, in which said means for applying torque comprises a nominally linear electromechanical DC torque having a motor winding and permanent magnet cooperatively arranged to provide a torque at said articulate couplers and between said linkage and said head or base.

9. The apparatus according to claim 8, in which said articulate couplers define pivot means.

10. The apparatus according to claim 9, in which said working head comprises a telescope.

11. The apparatus according to claim 10, in which said base comprises an earth orbiting platform.

12. The apparatus according to claim 11, including also means providing a desired working head spatial orientation signal, and means comparing said control signal derived from sensing said existing spatial orientation of said working head and said desired spatial orientation signal and generating an error signal therefrom, said means for applying torque being responsive to said error signal generation to correspondingly adjust the spatial orientation of said working head to a desired condition relative to said frame of reference.

13. The apparatus according to claim 12, including also transducer means generating further signals responsive to relative adjustment in angular position and angular velocity between said working head and said linkage, and means responsive to said further signals to adjust the relative position of said linkage and said working head.

14. The apparatus according to claim 13, including also means combining said further signals with said error signal, whereby a combined signal is generated responsive to adjustments to the relative positioning of said linkage and said working head.

15. A pointing and stabilization system adapted to point and hold a working head in precise and predetermined orientation relative to a frame of reference, including a rigid linkage comprising gimbal means coupling said working head and said base in axially opposed relation, said gimbal means defining first and second rotation enabling pivots, whereby said linkage is rotatably attached to said base at said first pivot, and said linkage is further rotatably attached to said working head at said second pivot, said first and second pivots being relatively spaced to so locate the linkage ideal center of percussion as to minimize disturbance torque effects on said working head, means determining simultaneously the angular position and the angular velocity of said working head relative to said frame of reference and the relative angular position and velocity between said working head and said linkage in signal generating relation, means applying torque between said linkage and said base at said first pivot selectively in generated signal responsive relation, and means applying torque between said linkage and said working head at said second pivot selectively in generated signal responsive relation, whereby said working head is pointed or stabilized in desired spatial orientation relative to said frame of reference and freely of disturbance effects.

16. The pointing and stabilization system according to claim 15, in which each of said pivots coincides with the center of percussion for the opposite linkage pivot.

17. The pointing and stabilization system according to claim 16, in which an axial line passing through both of said pivots lies within an axial locus including the working head center of gravity.

18. The pointing and stabilization system according to claim 16, in which an axial line passing through both of said pivots is controlled to lie within a determinable distance from the working head center of gravity.

* * * * *

UNITED STATES PATENT AND TRADEMARK OFFICE
CERTIFICATE OF CORRECTION

PATENT NO. : 4,403,838
DATED : September 13, 1983
INVENTOR(S) : Milton M. Beilock and John M. Wuerth It is certified that error appears in the above-identified patent and that said Letters Patent are hereby corrected as shown below:

On the title page
In the Abstract, line 12, after "sensing" and before "providing" change "the" to ---and---.

Column 2, line 27, delete "operating structure".

Signed and Sealed this

Twenty-third Day of October 1984

[SEAL]

Attest:

GERALD J. MOSSINGHOFF

Attesting Officer

Commissioner of Patents and Trademarks